(12) United States Patent
Gerwig et al.

(10) Patent No.: US 10,505,480 B2
(45) Date of Patent: Dec. 10, 2019

(54) CONTROLLER FOR HYDROELECTRIC GROUP

(71) Applicant: Alstom Renewable Technologies, Grenoble (FR)

(72) Inventors: Simon Gerwig, Grenoble (FR); Bilal Sari, Grenoble (FR); Frederica Garin, St. Martin d'Heres (FR); Carlos Canudas De Witt, Saint Ismier (FR)

( * ) Notice: Subject to any disclaimer, the term of this patent is extended or adjusted under 35 U.S.C. 154(b) by 45 days.

(21) Appl. No.: 15/290,268

(22) Filed: Oct. 11, 2016

(65) Prior Publication Data

US 2017/0110995 A1 Apr. 20, 2017

(30) Foreign Application Priority Data

Oct. 16, 2015 (EP) .................................. 15290262

(51) Int. Cl.
*H02P 9/10* (2006.01)
*F03B 13/08* (2006.01)
*G05B 17/02* (2006.01)
*F03B 15/00* (2006.01)
*H02P 103/20* (2016.01)

(52) U.S. Cl.
CPC ............. *H02P 9/105* (2013.01); *F03B 13/08* (2013.01); *F03B 15/00* (2013.01); *G05B 17/02* (2013.01); *F05B 2200/00* (2013.01); *F05B 2260/84* (2013.01); *F05B 2270/20* (2013.01); *F05B 2270/504* (2013.01); *H02P 2103/20* (2015.01); *Y02E 10/22* (2013.01); *Y02E 10/226* (2013.01)

(58) Field of Classification Search
CPC ......... H02P 9/105; F03B 13/08; G05B 17/02; Y02E 10/22
See application file for complete search history.

(56) References Cited

U.S. PATENT DOCUMENTS

| | | | | |
|---|---|---|---|---|
| 4,287,429 A | * | 9/1981 | Bashnin | F03B 15/16 290/40 C |
| 5,953,227 A | * | 9/1999 | March | G05B 23/0294 700/36 |
| 7,016,742 B2 | * | 3/2006 | Jarrell | F01K 13/02 700/28 |
| 7,199,482 B2 | * | 4/2007 | Hopewell | H02J 3/383 290/44 |
| 7,831,397 B2 | * | 11/2010 | Earlywine | G01F 25/0007 702/45 |
| 8,626,352 B2 | * | 1/2014 | Kalich | G06Q 10/04 700/291 |
| 8,648,487 B2 | * | 2/2014 | Rutschmann | E02B 9/022 290/54 |
| 9,026,257 B2 | * | 5/2015 | Kalich | G06F 17/5086 700/286 |

(Continued)

OTHER PUBLICATIONS

European Search Report issued in connection with corresponding EP application 15290262.3 dated May 16, 2016

(Continued)

*Primary Examiner* — Tulsidas C Patel
*Assistant Examiner* — Joseph Ortega
(74) *Attorney, Agent, or Firm* — Dority & Manning, P.A.

(57) ABSTRACT

Embodiments of the present invention generally relate to a new controller and a new control method for a hydraulic turbine and a synchronous generator, particularly to attenuate the effect of the vortex rope pressure oscillations on the active power.

6 Claims, 12 Drawing Sheets

(56) References Cited

U.S. PATENT DOCUMENTS

| | | | | |
|---|---|---|---|---|
| 10,316,833 B2* | 6/2019 | Kalich | .................. | F04B 35/004 |
| 2006/0238929 A1* | 10/2006 | Nielsen | .................. | H02P 9/006 |
| | | | | 361/20 |
| 2009/0021011 A1* | 1/2009 | Shifrin | ...................... | F03B 3/06 |
| | | | | 290/43 |
| 2011/0313777 A1* | 12/2011 | Baeckstroem | .......... | G10L 25/90 |
| | | | | 704/500 |
| 2013/0175871 A1* | 7/2013 | Knuppel | .................. | H02J 3/24 |
| | | | | 307/102 |
| 2014/0142779 A1* | 5/2014 | Stoettrup | .................. | H02J 3/28 |
| | | | | 700/297 |
| 2014/0375053 A1* | 12/2014 | Nielsen | .................. | H02J 3/386 |
| | | | | 290/44 |
| 2014/0376283 A1* | 12/2014 | Rodriguez | ................ | H02J 3/24 |
| | | | | 363/39 |
| 2016/0218510 A1* | 7/2016 | Harnefors | ................. | H02J 3/36 |
| 2016/0301216 A1* | 10/2016 | Terzija | ...................... | H02J 3/40 |
| 2016/0308357 A1* | 10/2016 | Yuan | ...................... | H02J 3/1857 |
| 2016/0315471 A1* | 10/2016 | Baone | ....................... | H02J 3/24 |
| 2019/0214826 A1* | 7/2019 | Du | .......................... | H02J 3/386 |

OTHER PUBLICATIONS

Ouassima Akhrif et al: "Application of a Multivariable Feedback Linearization Scheme for Rotor Angle Stability and Voltage Regulation of Power Systems" IEEE Transactions on Power Systems. IEEE Service Center, Piscataway, NJ, US. vol. 14. No. 2. May 1, 1999 (May 1, 1999), pp. 620-628. XP011089431, ISSN: 0885-8950 * section 1.2.5 *.

* cited by examiner

CONTROLLER FOR HYDROELECTRIC GROUP

TECHNICAL FIELD

Embodiments of the present invention generally relates to a new controller and a new control method for a hydraulic turbine and a synchronous generator, particularly to attenuate the effect of the vortex rope pressure oscillations on the active power. Within the purpose of embodiments of the present invention, it was developed a multi-input multi-output linear mathematical model including the whole hydroelectric group: the turbine, the hydraulic system and the synchronous generator connected to a grid. In this model the pressure oscillations induced by the partial load vortex rope are represented by an exogenous input in the draft tube of the turbine. Unlike classical approaches it is considered both the hydraulic system and the electrical system during the controller design. As an example, it was designed a $H_{infinity}$ output feedback controller to attenuate the effect of the pressure oscillations on the active power transmitted to the grid. Simulation results show that embodiments of the present invention may be successful at reducing the oscillations on the active power while respecting the specification on the voltage.

BACKGROUND

Hydraulic turbines are very useful to support the electrical grid stability when the demand is quickly varying. They convert the potential energy of the water into rotating mechanical energy, which is then converted to electrical energy by the generator.

FIG. 1 represents a multi-group hydroelectric power plant with a hydraulic turbine 1, a draft tube 2, a generator 3, a step-up transformer 4 and an electrical network (grid) 5. With the growing integration of intermittent renewable sources of electricity such as photovoltaic panels and wind turbines, hydroelectric power plants are an efficient way of supporting the grid but this leads to new challenges in their design and operation. Two of these challenges are a minimum time start-up of the turbine from standstill, and operating it at off-design conditions, such as partial load. According to embodiments of the present invention, it is disclosed a novel control algorithm particularly for the operation at partial or full load.

At partial load, more precisely when the flow through the turbine is a fraction of the optimal flow, reaction turbines exhibit a helical vortex rope in their draft tube resulting from the swirling flow exiting the runner, as shown in FIG. 2.

The interaction of this vortex rope with the draft tube can lead to a pressure perturbation propagating in the entire hydraulic system with a frequency in the range of 0.2 to 0.4 the turbine rotational frequency. Embodiments of the present invention address the technical disadvantages related to effects of the pressure perturbation on the produced electricity.

Indeed, these oscillations of pressure are converted in torque oscillations by the turbine and eventually in oscillations of active power transmitted to the network. In some cases, these oscillations of electric variables are unacceptable for operators because they don't comply with network specifications, described in the grid codes. These specifications of network operators describe the performances a power plant needs to have to be connected to the grid. The level of oscillations for the active power and voltage assume in this scenario a prominent relevance, as they need to be respected to avoid an excitation of the electrical grid modes of oscillation.

Traditionally, the control loop of the hydraulic turbine is decoupled from the excitation controller of the generator due to the difference in time response of the two subsystems, the generator having a faster response time. In the case of low frequency hydraulic oscillations, an interaction can appear between the hydraulic and electric subsystem thus worsening the oscillation. For this reason, the controller according to embodiments of the present invention rely on both electrical and hydraulic subsystems as a whole.

Most of the work on the control of hydraulic turbine has been focused on developing algorithms to improve robust performance of the controllers. The two main challenges of a hydraulic turbine governor are the non-linearity's of the turbine characteristic and the unstable zeros. Several control designs have been proposed in, including optimal PID gain scheduling, adaptive algorithms, robust control considering plant uncertainties, and more recently robust PID design where the robust performance of the PID controller is favourably compared to a more sophisticated $H_\infty$ controller. All these designs teach or suggest a linear model of the turbine, either a linearized model from the turbine characteristics or an ideal model developed in.

Additionally, an approach of simultaneously controlling both the turbine wicket gate opening and the generator excitation voltage has been developed in the field. The design is based on an ideal nonlinear model of the turbine and a full 7-order nonlinear model of the synchronous machine to improve stability after large electrical transients, for example a short-circuit, or a lightning bolt.

The concept of damping inter area oscillations using a power system stabilizer (PSS) for synchronous generator has been used in the field to design a power system stabilizer using the hydro governor system. The resulting approach provides much better damping of the low frequency inter area oscillations during poor grid conditions.

The concept of reducing the effect of the vortex rope on the electric power with the PSS on the synchronous generator only has also been explored. While the active power oscillations originating from hydraulic pressure fluctuations are attenuated, they are amplified on the reactive power and the voltage.

Considering that the vortex rope hits the elbow of the draft tube in the centre of it, the turbine draft tube has been modelled with two equal-length pipes and a pressure source in the centre. This model was developed to study the system stability when it is subject to the partial load vortex rope. The studied system consists of four hydro-electric groups connected to the electrical network.

BRIEF DESCRIPTION

According to embodiments of the present invention, it is proposed a controller, and a related method, configured to attenuate the active power oscillations of the hydroelectric group induced by pressure oscillations at partial or full load. First, the pressure perturbation created by the vortex rope is modelled as an exogenous perturbation using a model of the hydraulic subsystem where the draft tube is extracted from the turbine model. Then from a linearized model of the hydraulic and electromechanical subsystems it is designed a $H_\infty$ controller with a proper choice of weighting functions and LMI (Linear Matrix Inequalities) optimization. The contribution of embodiments of the present invention is that both the turbine wicket gate and the generator excitation voltage are controlled, unlike some designs in the field where only the generator excitation voltage is taken into account during the control design. Finally, the resulting controller is experimented in simulation using the full non-linear model of the system in the simulation software package Simsen, this program has been validated by physical measurements.

In the simulations, it was found that the controller according to an embodiment is able to attenuate the perturbation effects on the active power and comply with the specifications.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
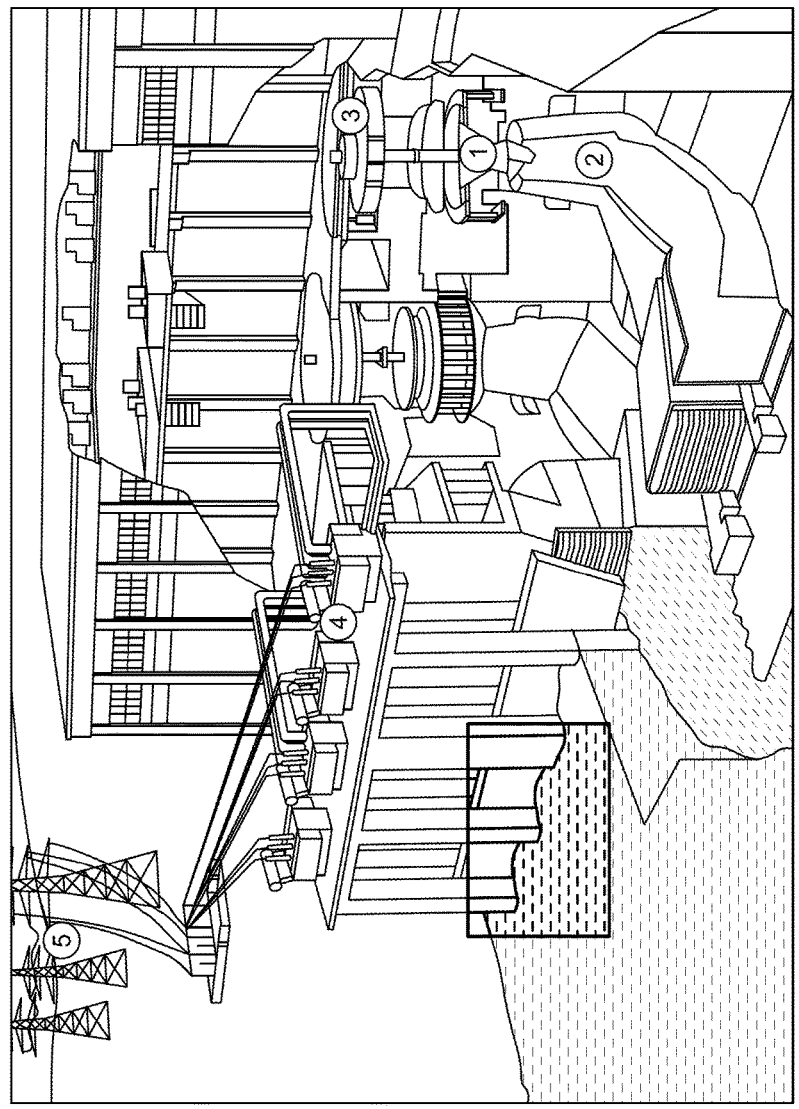
FIG. 1 shows a multi-group hydroelectric power plant according to an embodiment of the invention.
Figure 2:
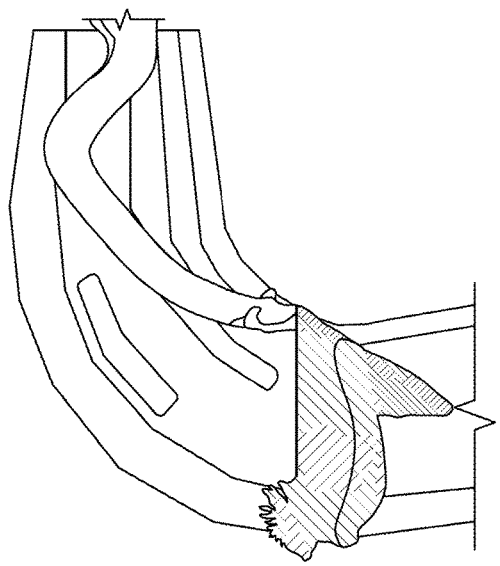
FIG. 2 shows a reaction turbine exhibiting a helical vortex rope in the draft tube when the flow through the turbine is a fraction of the optimal flow.

System Description and Mathematical Model
A. System Physical Description

The system is a hydroelectric group consisting of an upstream reservoir providing water to a pump turbine through a penstock; the turbine yields mechanical power to a synchronous generator connected to an electrical grid.

Some mathematical models of the pressure oscillations induced by the vortex rope have been developed in the hydraulic literature but they require a thorough study of the hydraulic system through measurements to determine the equations parameters which vary with the operating conditions.

For the purpose of the present solution, it was used a model where the head oscillations are induced by an exogenous perturbation in the draft tube of the turbine. The oscillations are represented by a sine function with only one frequency:

$$h_w = A_h \sin \omega_h t, \quad (1)$$

where $h_\omega$ is the head perturbation in the draft tube in meters, $A_h$ is the amplitude of the perturbation in meters, $\omega_h$ its frequency in rad/s and t the time in seconds. With few prior on-site measurements, it is possible to determine $\omega_h$. The amplitude $A_h$ is difficult to estimate; with the controller according to an embodiment this parameter is not needed. In this document, a specific physical system is disclosed as a non-limiting example. The main specifications of the physical system can be found in Table I.

B. Hydraulic Subsystem Mathematical Model
Turbine

The hydraulic turbine is represented by its so called hill charts that are built from laboratory tests.

TABLE I

PARAMETERS OF THE CONSTDERED SYSTEM

| | |
|---|---|
| Rated active power | 130 MW |
| Rotational speed | 136.36 rpm |
| Rated head | 71 m |
| Rated flow | 200 m³/s |
| Penstock length | 400 m |
| Perturbation frequency | 0.5 Hz |

They correspond to a non-linear mapping between the physical variables of the turbine. This mapping is represented in:

$$Q = f_1(H_n, \Omega_r, \alpha)$$

$$T_m = f_2(H_n, \Omega_r, \alpha), \quad (2)$$

where Q is the flow through the turbine, $H_n$ the head difference between the inlet and the outlet of the turbine, $\Omega_r$ the rotational speed, α the guide vane opening and $T_m$ the mechanical torque produced by the turbine.

These equations can be linearized around an operating point ($Q_0$; $H_{n0}$; $\Omega_{r0}$; $\alpha_0$; $T_{m0}$) to obtain:

$$\Delta Q = \alpha_1 \Delta H_n + \alpha_2 \Delta \Omega_r + \alpha_3 \Delta \alpha$$

$$\Delta T_m = \beta_1 \Delta H_n + \beta_2 \Delta \Omega_r + \beta_3 \Delta \alpha, \quad (3)$$

where the $\alpha_i$; $\beta_i$ are the tangents of the hill chart at the considered operating point.

Pipes

The dynamics of the conduits (the penstock and the two draft-tube pipes) is described by the hyperbolic partial differential equations in:

$$a^2 \frac{\partial Q}{\partial x} + gA \frac{\partial H}{\partial t} = 0 \quad (4)$$

$$\frac{\partial Q}{\partial t} + gA \frac{\partial H}{\partial x} + \frac{f}{2DA} Q|Q| = 0.$$

These equations may be discretize by using the finite elements method, so the pipe may be considered to be made of $N_b$ pipe elements of length $dx=L/N_b$. The number of elements $N_b$ has to be arbitrary high to be as close as possible to reality. Applying (4) on this small element $i \in [1, N_b]$ and linearizing around an operating point $(H_0; Q_0)$.

$$Q_{i+1} - Q_i + \sigma_1 \frac{dH_{i+1/2}}{dt} = 0 \tag{5}$$

$$H_{i+1/2} - H_{i-1+1/2} + \sigma_2 \frac{dQ_i}{dt} + \sigma_3 Q_i = 0,$$

TABLE II

HYDRAULIC NOTATIONS

| | |
|---|---|
| Q(x, t) | Water flow in pipe at section x and time t (m³/s) |
| H(x, t) | Water height at section x and time t (m) |
| x | Linear abscissa along the pipe (m) |
| t | Time (s) |
| g | Acceleration of gravity = 9.81 m/s² |
| L | Pipe length (m) |
| A | Pipe area (m²) |
| D | Pipe diameter (m) |
| a | Wave propagation velocity = 1200 m/s |
| f | Head loss constant | where $$\sigma_1 = \frac{Ag|dx}{a^2}, \sigma_2 = \frac{dx}{Ag}, \sigma_3 = \frac{f|Q_0|dx}{2gDA^2}. \tag{6}$$

Finally, the full model of a pipe discretized in Nb elements can be expressed by:

$$\Lambda \frac{d}{dt} \begin{pmatrix} Q_1 \\ H_{1+1/2} \\ Q_2 \\ \vdots \\ Q_{N_b} \\ H_{N_b+1/2} \\ Q_{N_b+1} \end{pmatrix} + \Sigma \begin{pmatrix} Q_1 \\ H_{1+1/2} \\ Q_2 \\ \vdots \\ Q_{N_b} \\ H_{N_b+1/2} \\ Q_{N_b+1} \end{pmatrix} = \begin{pmatrix} H_{in} \\ 0 \\ 0 \\ \vdots \\ 0 \\ 0 \\ -H_{out} \end{pmatrix}, \tag{7}$$

where $\Lambda$ and $\Sigma$ are defined by:

$$\Lambda = \begin{pmatrix} \frac{1}{2} l_{eq} & & & & & \\ & \sigma_1 & & & & \\ & & \sigma_2 & & (0) & \\ & & & \ddots & & \\ & (0) & & & \sigma_2 & \\ & & & & & \sigma_1 \\ & & & & & & \frac{1}{2}\sigma_2 \end{pmatrix}, \tag{8}$$

$$\Sigma = \begin{pmatrix} \frac{1}{2}\sigma_3 & 1 & 0 & & & & \\ -1 & 0 & 1 & 0 & & & \\ 0 & -1 & \sigma_3 & 1 & 0 & & \\ & & & \ddots & & & \\ & & 0 & -1 & \sigma_3 & 1 & 0 \\ & & & 0 & -1 & 0 & 1 \\ & & & & 0 & -1 & \frac{1}{2}\sigma_3 \end{pmatrix}. \tag{9}$$

Full Reduced-Order Hydraulic Subsystem

In an embodiment, forty elements are used for each pipe of the hydraulic system using (7) to have an acceptable accuracy, and these equations are combined with the turbine equations (2). This high order non-linear model is implemented in the software package Simsen and will be used for numerical simulations.

Figure 3:
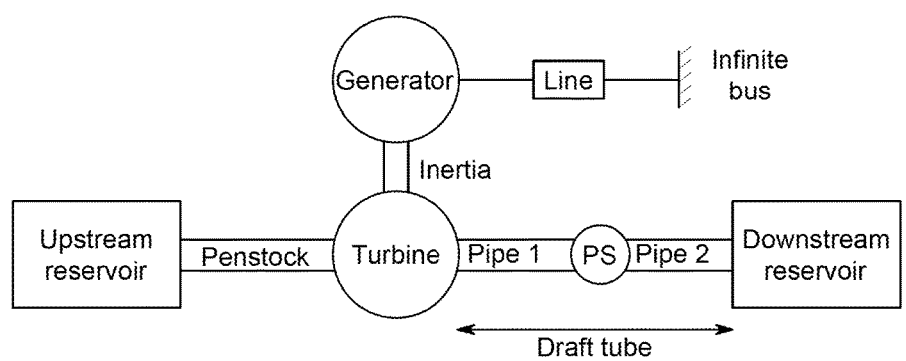
FIG. 3 shows negligible head deviations at the upstream and downstream reservoir and a difference in head between the outlet and the inlet of pipe 1 and pipe 2, respectively, due to external perturbation.

This model is linearized around the operating point $Q_0=0.5$ p.u. where the vortex rope is appearing. The head deviations at the upstream and downstream reservoir may be considered negligible and the external perturbation adds a difference in head between the outlet and the inlet of pipe 1 and pipe 2 respectively, see FIG. 3.

Figure 4:
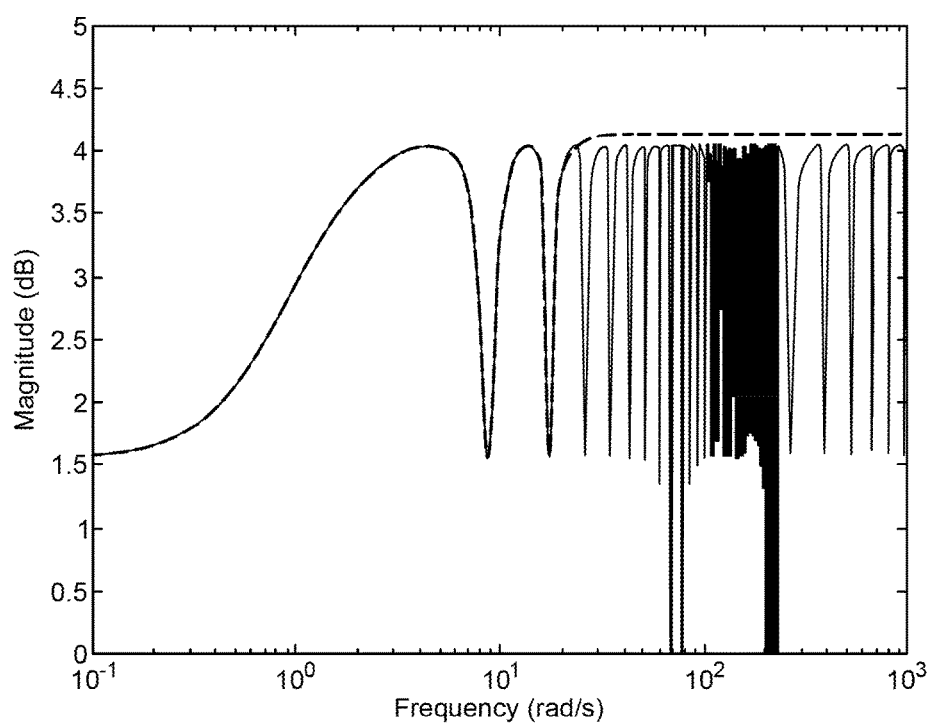
FIG. 4 shows a Bode diagram comparison between the high order and the reduced order models for the transfer function between the control input and the mechanical torque $T_m$.
Figure 5:
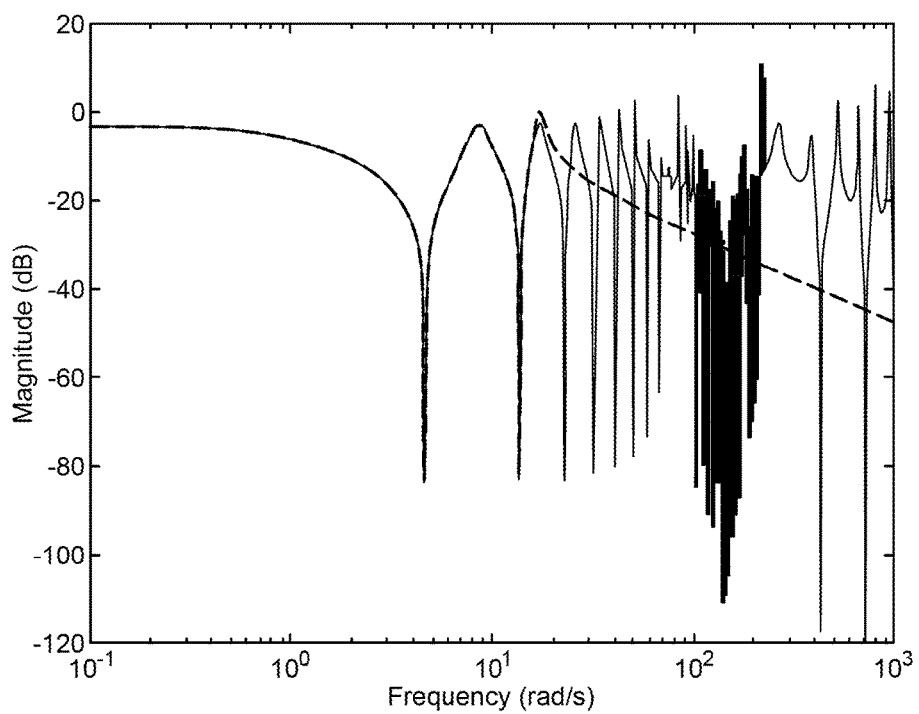
FIG. 5 shows a Bode diagram comparison for the transfer function between the perturbation input $h_\omega$ and the mechanical torque $T_m$.

Then the order of the mathematical model is reduced to build a lower order mathematical model that will be used for the controller design. The physical system, where all the numerical parameters were taken, has an actuator bandwidth limited to 5 Hz, and the perturbation frequency, $\omega_h=0.5$ Hz in (1). Therefore, it may be beneficial to keep the poles and zeros of the system in this frequency region. FIG. 4 shows the Bode diagram comparison between the high order and the reduced order models for the transfer function between the control input and the mechanical torque $T_m$, while FIG. 5 shows the Bode diagram comparison for the transfer function between the perturbation input $h_\omega$ and the mechanical torque $T_m$.

The resulting state-space hydraulic model is represented by:

$$\dot{X}_h = A_h X_h + \begin{vmatrix} B_h \alpha + B_{he}\Omega_r + B_{hw}h_w \end{vmatrix} \tag{10}$$

$$Y_h = T_m = C_h X_h + D_h \begin{pmatrix} \alpha \\ \Omega_r \end{pmatrix},$$

where $X_h$ is the state vector, $\alpha$ the guide vane opening (control input), $\Omega_r$ the rotational frequency, $h_\omega$ the head perturbation from (1) and $Y_h$ the output. All these variables are deviations around an operating point. The model reduction is based on assumptions of the physical system taken into account, and this reduction is realized on numerical values. The matrix entries of $A_h$, $B_{he}$, $B_{hw}$, $C_h$ and $D_h$ can be found in Appendix A.

Electro-Mechanical Subsystem Mathematical Model

The generator and the electrical network are modelled as the well-known SMIB (Single Machine Infinite Bus). The third order non-linear model is linearized around an operating point $(P_{r0}; E_{r0}; Q_{r0})$. The resulting linear state-space system is described by:

$$\dot{X}_e = A_e X_e + B_e \begin{pmatrix} \Delta T_m \\ \Delta E_{fd} \end{pmatrix} \tag{11}$$

$$Y_e = C_e X_e,$$

Where the algebraic expressions of the variables are defined as follows:

$$X_e = \begin{pmatrix} \Delta\omega_r \\ \Delta\delta \\ \Delta\Psi_{fd} \end{pmatrix}, \quad Y_e = \begin{pmatrix} \Delta\omega_r \\ \Delta P_t \\ \Delta Q_t \\ \Delta E_t \end{pmatrix},$$

$$A_e = \begin{pmatrix} a_{11} & a_{12} & a_{13} \\ a_{11} & 0 & 0 \\ 0 & a_{12} & a_{13} \end{pmatrix}, \quad B_e = \begin{pmatrix} b_{11} & 0 \\ 0 & 0 \\ 0 & b_{32} \end{pmatrix},$$

$$C_e = \begin{pmatrix} 1 & 0 & 0 \\ 0 & c_{22} & c_{23} \\ 0 & c_{32} & c_{33} \\ 0 & c_{42} & c_{43} \end{pmatrix}.$$

The three state variables are $\Delta\omega_r$ the speed deviation in per unit, $\Delta\delta$ the load angle deviation and $\Delta\Psi_{fd}$ the field flux deviation. $\Delta T_m$ is the mechanical torque input provided by the turbine, $K_D$ the friction coefficient, H the inertia constant in per unit (see Appendix B), $\omega_0 = 2\pi f_0$ where $f_0$ is the network frequency, $\Delta E_{fd}$ the excitation voltage input (the controller output).

The four measured outputs are $\Delta\Omega_r$, $\Delta P_t$ deviation of active power, $\Delta Q_t$ deviation of reactive power and $\Delta E_t$ deviation of voltage.

The expressions of the $a_{ij}$, $b_{ij}$ and $c_{ij}$ constants and of the initial conditions can be found in Appendix B and the numerical values in Appendix A.

Full Hydroelectric Mathematical Model

Combining the equations of the hydraulic model (10) and the electro-mechanical model (11) leads to a state-space model of a hydroelectric group, named G(s), described in:

$$\dot{x} = Ax + Bu + B_w h_w \quad (12)$$
$$y = Cx,$$
$$x = \begin{pmatrix} X_h \\ X_e \end{pmatrix}, \quad y = Y_e, \quad u = \begin{pmatrix} \alpha \\ E_{fd} \end{pmatrix}$$

where the state vector x is a concatenation of the hydraulic state vector $X_h$ and the electric state vector $X_e$, the output vector is the electric output vector $Y_e$ and u the two control variables which are the guide vane opening $\alpha$ and the excitation voltage $E_{fd}$.

TABLE III

STEP RESPONSE SPECIFICATIONS

| | Active power | | Voltage |
|---|---|---|---|
| $O_s$ | 30% of $\Delta P$ | $O_s$ | 10% of $\Delta E_t$ |
| $t_{90}$ | 25 s | $t_{63}$ | 0.8 s |
| $\epsilon_s$ | 1% of $P_{max}$ | $t_{\pm 5\%}$ | 5 s |
| Ramp error | 10% of $P_{max}$ | $\epsilon_s$ | 0.2% of $E_m$ |

The concatenated matrices are defined as follows:

$$A = \begin{pmatrix} A_h & B_{he} & 0 & 0 \\ & & \vdots & \vdots \\ & & 0 & 0 \\ \hline b_{11}C_h & & & \\ 0 & \dots & 0 & \tilde{A}_e \\ 0 & \dots & 0 & \end{pmatrix},$$

$$\tilde{A}_e = A_e + \begin{pmatrix} b_{11}D_{h_2} & 0 & 0 \\ 0 & 0 & 0 \\ 0 & 0 & 0 \end{pmatrix},$$

$$B = \begin{pmatrix} B_h & 0 \\ & \vdots \\ & 0 \\ \hline b_{11}D_{h_1} & 0 \\ 0 & 0 \\ 0 & b_{32} \end{pmatrix}, \quad C = (0_{4,7} \mid C_e)$$

Formulation and Controller Design Problem

According to an aspect, an objective of the controller according to the present invention is to reduce the effect of the pressure oscillations on the active power, without amplifying the oscillation of the voltage to a point where the specifications are not respected.

A. Specifications

Performance specifications that a hydraulic turbine for the active power and a generator for the voltage vary among network operators. As a non-limiting case, herewith detailed for exemplary purposes, it is chosen to extract those specifications from technical requirements of one particular operator.

Figure 6A:
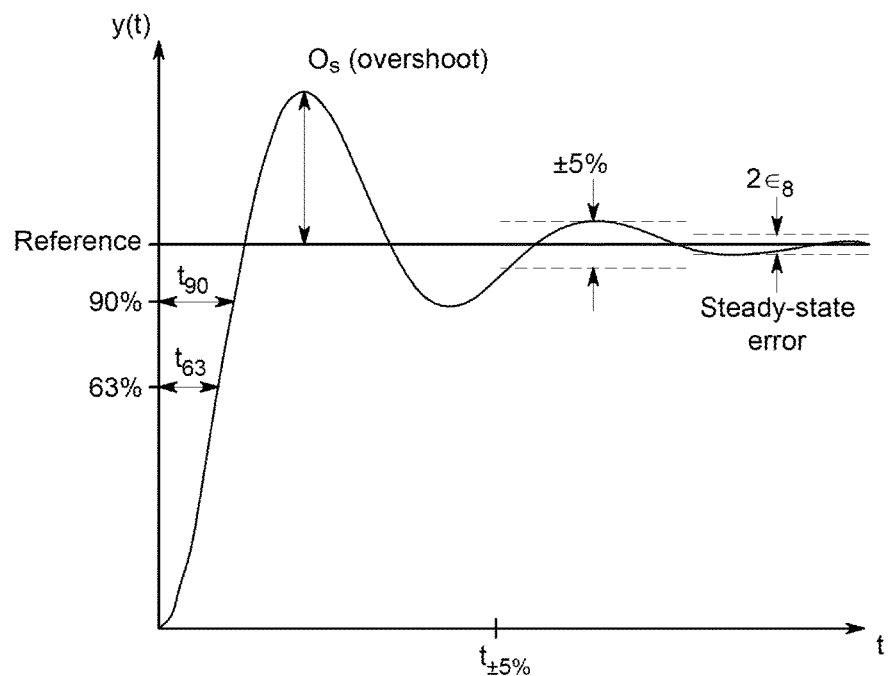
FIG. 6A shows a curve defining specification constants.

The specifications are given for the response to a step input for both active power and voltage, another specification of ramp error is given for the active power. The definitions of specification constants can be found in FIG. 6A and the values associated with them in Table III for the active power and the voltage.

These specifications must be guaranteed in closed-loop even under the line impedance variation.

The exemplary embodiment of the invention herewith disclosed is focused on an existing system as discussed above, hence the specifications of attenuation for the external perturbation are linked to the physical values of it. The perturbation of this system is represented by a sine function of frequency 0.5 Hz. The amplitude of the oscillations is difficult to estimate because it is the result of a complex hydraulic phenomenon. Thus, it is selected an amplitude of the perturbation of 6 m that induces oscillations of the active power with a peak-to-peak amplitude of around 3.6% of $P_{max}$ which is superior to the 2% of the specifications.

It is important to note that an important parameter for the controller according to an embodiment of the invention is the frequency of the oscillations and not the amplitude; indeed the controller is synthetized by adding damping to the system for a particular frequency range.

B. Control Problem Formulation

An exemplary and non-limiting method for synthetize the controller according to an embodiment of present invention is now described.

As the objective is to minimize the influence of the exogenous perturbation $h_\omega$ on the electrical values $P_t$ and $E_t$ of the hydroelectric group, it is chosen the $H_\infty$ approach to synthetize the controller, presented here only for exemplary purposes, as other approaches may be possible as well.

Figure 6B:
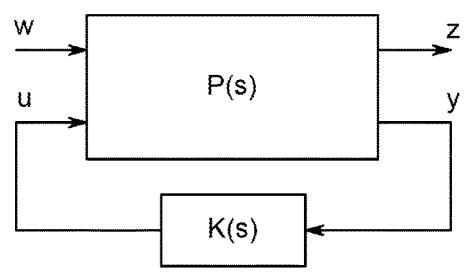
FIG. 6B shows a simplified block diagram sketching the standard form problem or linear fractional transformation which is used to develop the controller.

FIG. 6B depicts a simplified block diagram sketching the standard form problem or linear fractional transformation which is used to develop the controller. P(s) represents a mathematical model of the hydroelectric group, taking into account the above detailed equations G(s) (12) and some weighting functions $W_1(s)$, $W_2(s)$, $W_3(s)$ and $W_4(s)$ which will be explained later, and K(s) the controller according to an embodiment of the invention. ω is the exogenous input vector (references, disturbances), z the controlled output vector, y the measurement vector and u the control input vector.

Figure 7:
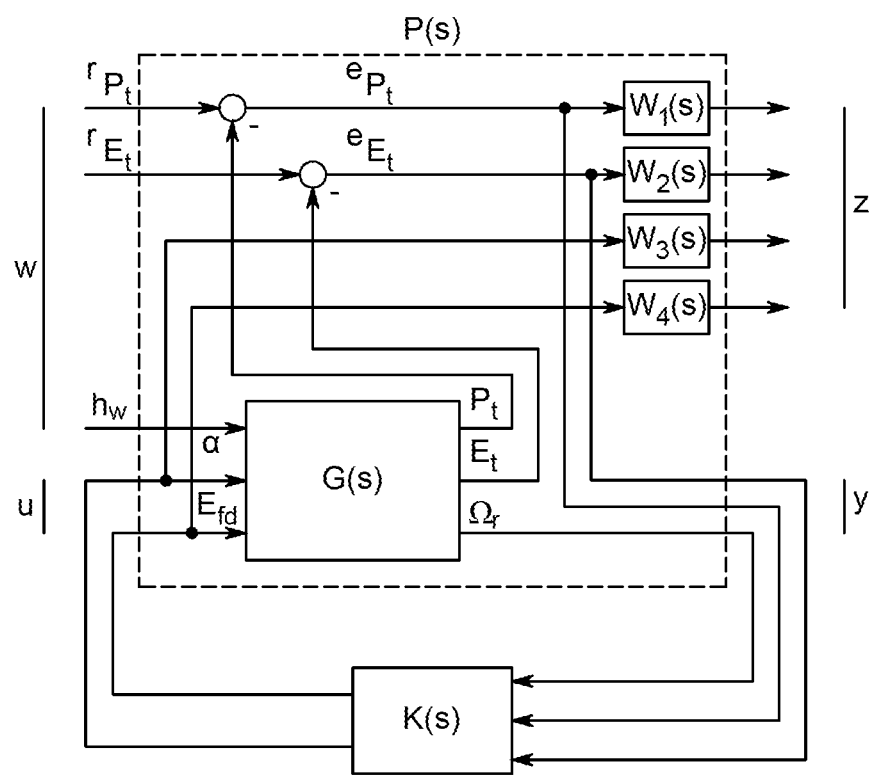
FIG. 7 shows the block diagram of FIG. 6B with additional details.

With reference to next FIG. 7, it is shown the block diagram of FIG. 6B with more details.

$T_{zw}(s)$ is defined as a closed-loop transfer matrix between the exogenous inputs ω and the controlled outputs z, and it is given by the relation:

$$T_{zw}(s)=P_{zw}(s)+P_{zu}|(s)K(s)(I-P_{yu}(s)K(s))^{-1}P_{yw}(s), \quad (13)$$

As shown in diagram 7, the mathematical model P(s) has two inputs, which are ω and u, and two outputs z and y. Variables α and $E_{fd}$ calculated by the controller K(s). $r_{Pt}$ and $r_{Et}$ are references values of active power and voltage which are dictated by technical requirements and $h_\omega$ represents the perturbation with a given amplitude and frequency. Mathematical model P(s) calculates values $P_t$, $E_t$ and $\Omega$ which are active power, voltage and shaft rotational speed respectively. Variances indicated as $e_{Pt}$ and $e_{Et}$ of calculated values $P_t$, $E_t$ versus reference values $r_{Pt}$, $r_{Et}$, are sent, together with the rotational speed $\Omega_r$, to the controller for a subsequent iteration. Moreover, said variances $e_{Pt}$ and $e_{Et}$ are sent together with input u to weighting functions $W_n(s)$ for delivering controlled output z, as illustrated.

In the relation (13), $P_{zw}(s)$ indicates a sub-part of P(s) related to a transfer function from the input ω to output z (wherein s is the Laplace operator). Similarly, term $P_{yu}(s)$ indicates a sub-part of P(s) which takes into account a transfer function from the input u to output y. The same notation applies to all other terms in the relation (13). I is the identity matrix of appropriate dimension.

The $H_\infty$ control problem can be then formulated as follows: finding a controller K(s) that stabilizes the hydroelectric group, modelled by P(s), such that:

$$\|T_{zw}(s)\|_\infty < \gamma \quad (14)$$

where $\|\cdot\|_\infty$ is the infinity norm and γ>0 is a parameter.

As the infinity norm is peak value over the whole frequency range, by choosing a γ small enough, the controller will minimize the effect of the exogenous inputs on the outputs.

There are several algorithms to solve the problem described in (14), such as solving Riccati equations or solving Linear Matrix Inequalities (LMI).

In order to comply with the specifications (FIG. 6A and Table III), it is necessary to use weighting functions on the controlled outputs.

Some guidelines for selecting the general shapes of the weighting functions are disclosed in the field.

The structure used to specify the step response performance is described in:

$$W_{step(s)} = \frac{s/M_s + \omega_b}{s + \omega_b \epsilon_1}, \quad (15)$$

where $M_s$ is the high frequency gain of the corresponding closed-loop transfer function, $\omega_b$ the bandwidth with which the time response can be specified and $\epsilon_1$ (the steady-state error).

The second structure used to specify the damping of a sinusoidal perturbation is described by:

$$W_{sinus}(s) = \frac{s^2 + \alpha s + \omega_{0_{min}} \omega_{0_{max}}}{s^2 + \epsilon_{max} \alpha s + \omega_{0_{min}} \omega_{0_{max}}}. \quad (16)$$

This filter provides damping for a family of sinusoidal signals centred on $\omega_0 = \sqrt{\omega_{0_{min}} \omega_{0_{max}}}$. Where $\epsilon_{max}$ is the desired gain of the closed-loop transfer function considered at $\omega_0$, and α is defined as:

$$\alpha = \frac{(\omega_{0_{max}} - \omega_{0_{min}})}{\epsilon} \sqrt{\frac{1-\epsilon^2}{1-\epsilon_{max}}},$$

where $\epsilon > \epsilon_{max}$ is the maximum gain of the closed-loop transfer function considered $\forall_\omega \in [\omega_{0_{max}}, \omega_{0_{min}}]$.

In order to choose the weighting function numerical values the technical specifications are used together with some necessary knowledge of the hydroelectric group.

It was chosen, for the active power error, a product of a $W_{step}$ for the tracking and regulation specifications and $W_{sinus}$ to add damping at 0.5 Hz. For example, $M_s=2$, $\omega_b=0.35$, $\epsilon_1=5\times10^{-3}$ and $\omega_{0min}=2$, $\omega_{0max}=4.93$, $\epsilon=0.95$ and $\epsilon_{max}=0.12$.

Then, for the voltage error, only a weighting function of the shape $W_{step}$ was chosen for the tracking and regulation specifications whilst an additional $W_{sinus}$ term is not needed since the hydroelectric group already has enough damping at 0.5 Hz to comply with the specifications. In this instance, $M_s=1$, $\omega_b=10$ and $\epsilon_1=5\times10^{-3}$.

Usually guidelines for the control inputs advise using high pass filters to limit the control at high frequencies, but here simpler static gains were chosen because they give good enough results, while avoiding an increase of the controller order.

The chosen weighting functions for the block diagram of FIG. 7 are:

$$W_1(s) = \frac{s+0.7}{2s+0.0035} \frac{s^2+0.97s+9.86}{s^2+0.12s+9.86},$$

$$W_2(s) = \frac{s+10}{s+0.05},$$

$$W_3(s) = 1,$$

$$W_4(s) = 0.01.$$

Figure 8:
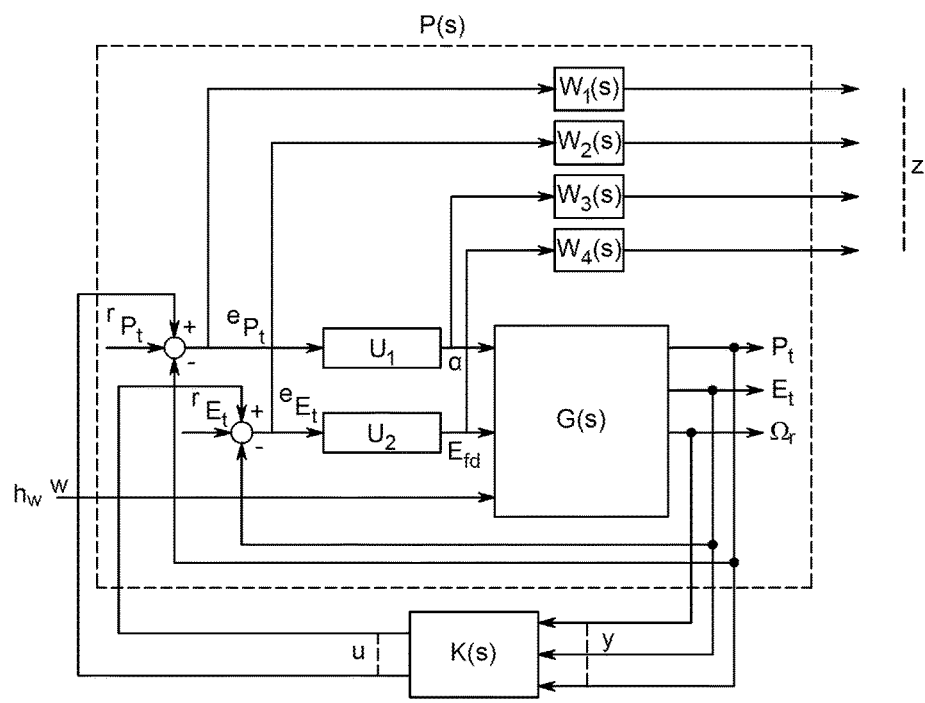
FIG. 8 shows a block diagram of an alternative method for synthetizing the controller.

With reference now to following FIG. 8 it is represented a block diagram associated to an alternative method for synthetizing the controller K(s) according to an embodiment of the present invention. The block diagram of FIG. 8 is substantially equivalent to what already disclosed, with the difference that units $U_1$ and $U_2$ are included in the mathematical model P(s) and are configured to calculate input values α and $E_{fd}$ respectively, which are fed to G(s), and the controller K(s) elaborates the input control variables u which adjust the variances $e_{Pt}$ and $e_{Et}$ disclosed above.

Figure 9:
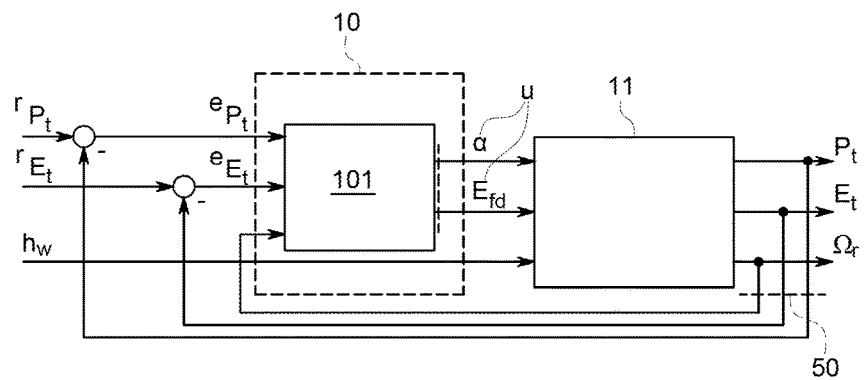
FIG. 9 shows a block diagram depicting a functioning scheme of the controller.

Turning to next FIG. 9, it is shown a block diagram depicting a functioning scheme of the controller according to an embodiment of the present invention associated to a physical hydroelectric group.

As seen in first FIG. 1, the hydroelectric group comprises a hydraulic subsystem which includes a turbine, a penstock and a draft tube pipe located respectively upstream and downstream the turbine. The hydroelectric group additionally comprises an electromechanical subsystem which includes a generator and an electrical network connected thereto.

The controller, depicted in the diagram by the dashed box 10, is configured to receive from a measuring unit (not shown), in a closed-loop fashion, an output signal 50 associated to electrical measured values of the hydroelectric group 11. Specifically, the measured values include the active power $P_t$ and the voltage $E_t$ associated to the generator. The rotational velocity of the shaft $\Omega_r$ is also measured.

Controller 101 comprises a processor 101 which, based on said output signal 50, is configured to elaborate input control variables u which are in turn fed to the physical hydroelectric group 11. As explained above, the processor 101 elaborates input control variables u based on the mathematical model G(s) of the hydroelectric group which combines equations modelling the hydraulic sub-system and equations modelling the electro-mechanical sub-system.

The input control variables include an angle $\alpha$ of a guide vane opening of the turbine and an excitation voltage $E_{fd}$ of the generator.

More specifically, the output signal 50 fed to the controller 10 include variances $e_{Pt}$, $e_{Et}$ of the measured electrical values $P_t$ and $E_t$ versus reference respective values $r_{Pt}$ and $r_{Et}$.

In the embodiment depicted in FIG. 9, the output signal 50 is fed to the process 101 of the controller 10.

Figure 10:
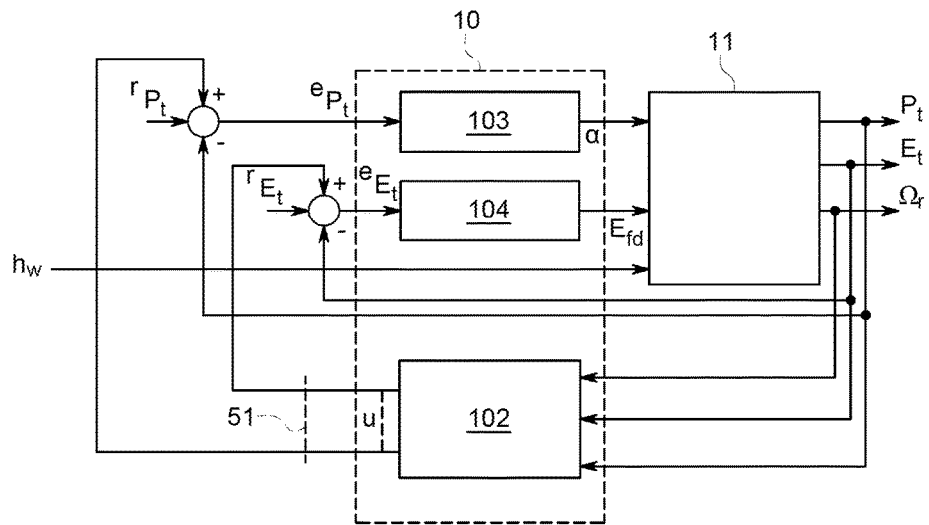
FIG. 10 shows an alternative embodiment of a controller.

With reference to next FIG. 10, it is shown an alternative embodiment. In this alternative embodiment, controller 10 comprises a first control unit 103 configured to receive as input a first variance $e_{Pt}$ of the measured active power $P_t$ versus the reference value $r_{Pt}$ and to elaborate as output the control value $\alpha$; a second control unit 104 configured to receive as input a second variance $e_{Et}$ of the measured voltage $E_t$ versus the reference value $r_{Et}$ and to elaborate as output the control value $E_{fd}$.

Controller 10 comprises a processor 102 which is configured to receive as input the measured electrical values $P_t$ a $E_t$ of the generator and return a signal 51 apt to adjust said first and second variances $e_{Pt}$ and $e_{Et}$. The processor 102 elaborates input signal 51 based on the mathematical model G(s) which models the hydroelectric group 11 combining equations associated to the hydraulic and electromechanical sub-systems.

Therefore, in this case, input variables u elaborated by the processor 102 are not the guide vane opening and the excitation voltage, but a correction value to modify the variances of the measured active power and voltage which are fed to the first control unit 103 and second control unit 104, respectively.

Simulation Results

A. Comparison with Classical Controller

The controller according to an embodiment of the invention is simulated on a full non-linear model of the hydroelectric group described in FIG. 1. The hydraulic subsystem is modelled with a high number of pipe elements in each pipe using (7), the turbine is represented by its nonlinear hill charts (2). To do this, a software package was used which has been validated with on-site measurements to simulate the hydraulic sub-system. The generator mathematical model is the 7-th order non-linear model with damper windings along with the second order network model. For the network model it was chosen to display the result with a value of $X_E$=0.3 because it leads to the highest oscillation amplitude for the voltage.

We compare the results with the classical controllers for the turbine and the synchronous generator which are designed separately to give good tracking and regulation performance, and are not intended to reduce the pressure oscillation effects.

The structure of the turbine controller is a proportional integral with optimized parameters, and the structure of the voltage controller is a lead-lag.

Figure 11:
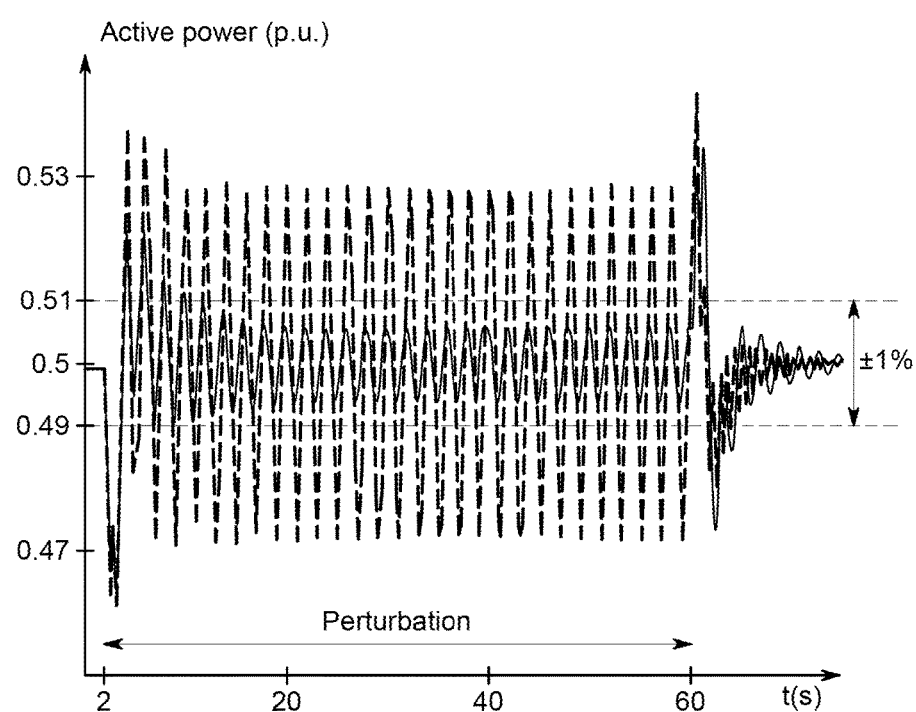
FIG. 11 shows a comparison of active power between a classical controller and the controller according to an embodiment of the present invention.
Figure 12:
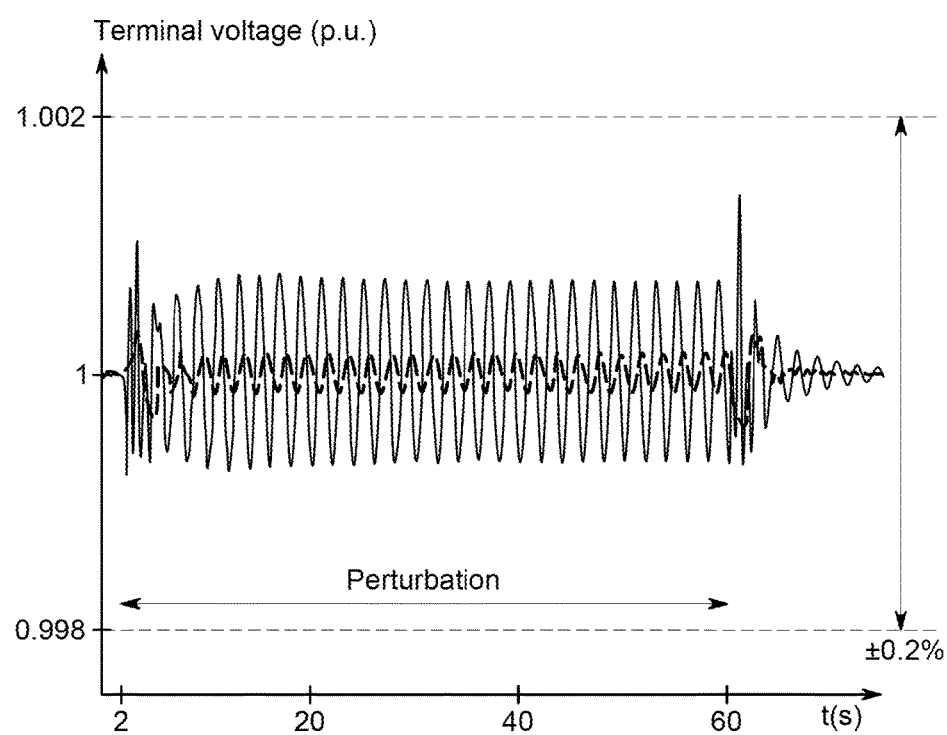
FIG. 12 shows a comparison of voltage between a classical controller and the controller according to an embodiment of the present invention.
Figure 13:
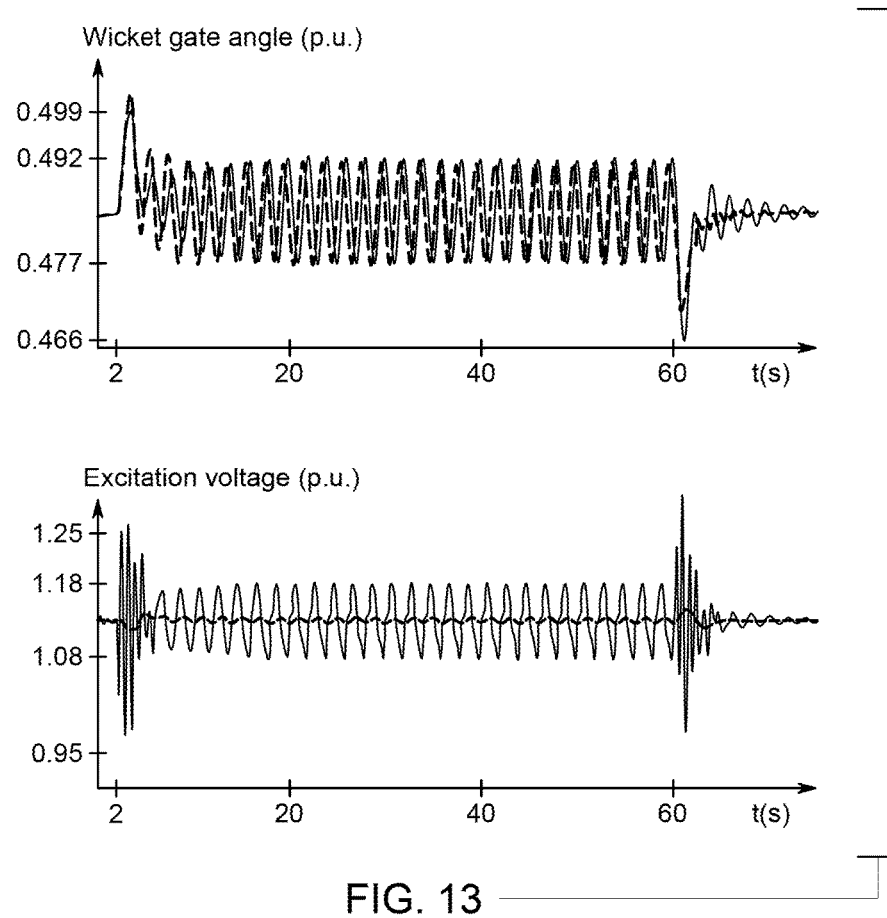
FIG. 13 shows a comparison of the control inputs between a classical controller and the controller according to an embodiment of the present invention.

The initial conditions are $P_{t0}$=0.5 p.u., $E_{t0}$=1 p.u. and $Q_{t0}$=0 p.u., applying a sinusoidal perturbation with an amplitude of 6 m and a frequency of 0.5 Hz between 2 s and 60 s of the simulation. The comparison between the classical (dashed line) and the controller according to an embodiment of the present invention (continuous line) for the active power is in FIG. 11, for the voltage in FIG. 12 and for the control inputs in FIG. 13.

The simulation results show that the innovative controller allows attenuating the effect of the head perturbation created by the partial load vortex rope. The oscillations of active power are kept under 1% of maximum active power while the voltage oscillations are also under 0.2% of nominal voltage. The peak-to-peak amplitude of the control needed for the guide vane opening is 0.54 degrees which is quite small and given the frequency (0.5 Hz) should be realizable with physical actuators (hydraulic cylinders). The same can be said for the excitation voltage oscillating between 1.08 and 1.18 p.u.

Figure 14:
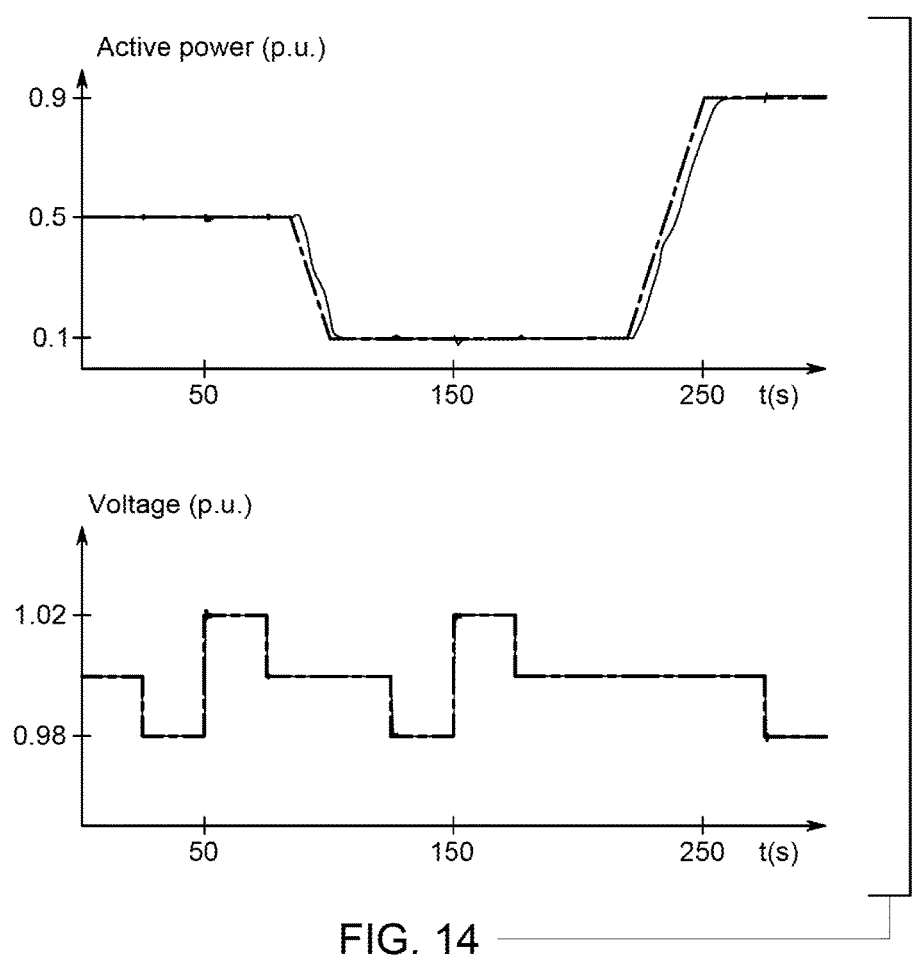
FIG. 14 shows results of a simulation comparing a reference to the controller according to an embodiment of the present invention.

In order to verify that the controller according to an embodiment of the invention does not deteriorate the tracking performances of the system, an active power ramp reference of 2.7% per second and voltage steps of 2% is applied. The results of the simulation are plotted in FIG. 14 (dashed line is the reference whilst the continuous line plots the controller according to an embodiment of the invention).

It will be appreciated that the controller allows the system to be stable for all operating points and to comply with the tracking performance specifications.

As a conclusion, it is successfully developed an innovative controller for both the turbine wicket gate opening and the generator excitation voltage which attenuates the effect of a pressure perturbation in the turbine draft tube on the active power.

TABLE IV

HYDRAULIC NUMBERICAL VALUES

| Penstock | Pipe 1 & 2 | Turbine | |
| --- | --- | --- | --- |
| L = 400 m | L = 13 m | $\alpha_1$ = 0.39 | $\beta_1$ = 1.11 |
| | $N_b$ = 40 | $\alpha_2$ = 1.34 | $\beta_2$ = 1.36 |
| | D = 7.90 m | $\alpha_3$ = −1.64 | $\beta_3$ = −11.29 |
| | f = $10^{-2}$ | | $\gamma_{max}$ = 35.5° |

This allows the operation of the hydroelectric group at partial loading of the turbine where a vortex rope builds up in the draft tube without compromising the quality of the electrical power produced and complying with tight network specifications.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

APPENDIX A

Numerical Values

A. Hydraulic Subsystem

The hydraulic subsystem is linearized around the operating point $T_{m0}=0.5$ p.u. with the parameters given in Table IV.

The numerical values of the matrices of (10) are given here:

$$A_h = \begin{pmatrix} -0.81 & 13.1 & -7.4 & 0.52 & 1.1 & 5.1 & 5.8 \\ -12.9 & -1.0 & 3.1 & 1.8 & 5.2 & 4.0 & -1.7 \\ 7.6 & -3.4 & -0.59 & 22.1 & 5.4 & 6.1 & 2.1 \\ -0.7 & -1.8 & -22.2 & -0.77 & 4.1 & -8.4 & -2.8 \\ -0.94 & -5.2 & -5.0 & -3.8 & -1.2 & 4.6 & -4.3 \\ -5.3 & -4.2 & -6.1 & 8.6 & -4.9 & -1.1 & -1.2 \\ -6.2 & 2.0 & -2.9 & 3.0 & 4.4 & 1.1 & -1.1 \end{pmatrix}$$

$$B_h = \begin{pmatrix} -0.33 \\ -0.99 \\ 0.18 \\ -1.6 \\ 1.2 \\ -1.0 \\ -2.8 \end{pmatrix} \quad B_{he} = \begin{pmatrix} 0.027 \\ 1.1 \\ -0.68 \\ 1.9 \\ -1.1 \\ 0.92 \\ 2.9 \end{pmatrix} \quad B_{hw} = \begin{pmatrix} -0.15 \\ -0.14 \\ -0.10 \\ 0.040 \\ -0.50 \\ 0.10 \\ 0.40 \end{pmatrix}$$

$$C_h = (1.4 \quad -2.0 \quad 1.9 \quad -3.5 \quad 2.8 \quad -0.93 \quad -5.2)$$

$$D_h = (-2.3 \quad -4.6)$$

B. Electrical Subsystem

The electrical subsystem is linearized around the operating point $P_{t0}=0.5$ p.u., $E_{t0}=1$ p.u. and $Q_{t0}=0$ p.u.

The matrices of (11) are expressed below.

$$A_e = \begin{pmatrix} 0 & -0.18 & -0.11 \\ 314 & 0 & 0 \\ 0 & -0.073 & -0.27 \end{pmatrix} \quad B_e = \begin{pmatrix} 0.16 & 0 \\ 0 & 0 \\ 0 & 0.13 \end{pmatrix}$$

$$C_e = \begin{pmatrix} 1 & 0 & 0 \\ 0 & 1.10 & 0.69 \\ 0 & 0.14 & 1.39 \\ 0 & -0.0044 & 0.40 \end{pmatrix}$$

With the synchronous machine parameter numerical values detailed in Table V.

TABLE V

| ELECTRICAL NUMERICAL VALUES | |
| --- | --- |
| $X_{de} = 0.971$ | $L_l = 0.175$ |
| $X_{qs} = 0.682$ | $R_a = 2.58 \times 10^{-3}$ |

TABLE V-continued

| ELECTRICAL NUMERICAL VALUES | |
| --- | --- |
| $L_{adu} = 0.918$ | $X_{ds}' = 0.277$ |
| $L_{ads} = 0.796$ | $L_{aqs} = 0.507$ |
| $L_{fd} = 0.155$ | $R_{fd} = 3.92 \times 10^{-4}$ |
| $X_E = 0.3$ | $R_E = 0.03$ |

APPENDIX B

Electro-Mechanical Model

In this section, we define the matrices of the electromechanical state-space model as well as the expressions to calculate the initial conditions of the machine. Table VI is the nomenclature of all electro-mechanical variables.

A. Matrix Constants

The expressions for the matrix constants of (11) are developed as follows:

$$a_{11} = -\frac{K_D}{2H} \quad a_{12} = -\frac{K_1}{2H} \quad a_{13} = -\frac{K_2}{2H} \quad (17)$$

$$a_{21} = \omega_0 = 2\pi f_0$$

$$a_{32} = -\frac{\omega_0 R_{fd}}{L_{fd}} m_1 L_{ads}'$$

$$a_{33} = -\frac{\omega_0 R_{fd}}{L_{fd}} \left[ 1 - \frac{L_{ads}'}{L_{fd}} + m_2 L_{ads}' \right]$$

$$R_T = R_a + R_E$$

$$X_{T_q} = X_E + (L_{aqs} + L_l) = X_E + X_{qs}$$

$$X_{T_d} = X_E + (L_{ads}' + L_l) = X_E + X_{ds}'$$

$$D = R_T^2 + X_{T_q} X_{T_d}$$

$$L_{ads}' = \frac{1}{\frac{1}{L_{ads}} + \frac{1}{L_{fd}}}$$

$$b_{11} = \frac{1}{2H} \quad b_{\beta 2} = \frac{\omega_0 R_{fd}}{L_{adu}}$$

$$c_{22} = n_1(\Psi_{ad0} + L_{aqs} i_{d0} - R_a i_{q0}) - m_1(\Psi_{aq0} + L_{ads}' i_{q0} + R_a i_{qd0})$$

$$c_{23} = n_2(\Psi_{ad0} + L_{aqs} i_{d0} - R_a i_{q0}) -$$

$$m_2(\Psi_{aq0} + L_{ads}' i_{q0} + R_a i_{qd0}) + \frac{L_{ads}'}{L_{fd}} i_{q0}$$

$$c_{32} = m_1(\Psi_{ad0} - (L_l + L_{ads}') i_{d0}) + n_1(\Psi_{aq0} - (L_l + L_{aqs}) i_{q0})$$

$$c_{33} = m_2(\Psi_{ad0} - (L_l + L_{ads}') i_{d0}) + n_2(\Psi_{aq0} - (L_l + L_{aqs}) i_{q0}) + \frac{L_{ads}'}{L_{fd}} i_{d0}$$

$$c_{42} = \frac{e_{d0}}{E_{t0}}(-R_a m_1 + L_l n_1 + L_{aqs} n_1) + \frac{e_{q0}}{E_{t0}}(-R_a n_1 + L_l m_1 + L_{ads}' m_1)$$

$$c_{43} = \frac{e_{d0}}{E_{t0}}(-R_a m_2 + L_l n_2 + L_{aqs} n_2) +$$

$$\frac{e_{q0}}{E_{t0}}\left(-R_a n_2 + L_l m_2 + L_{ads}'\left[\frac{1}{L_{fd}} - m_2\right]\right)$$

$$K_1 = n_1(\Psi_{ad0} + L_{aqs} i_{d0}) - m_1(\Psi_{aq0} + L_{ads}' i_{q0})$$

$$K_2 = n_2(\Psi_{ad0} + L_{aqs} i_{d0}) - m_2(\Psi_{aq0} + L_{ads}' i_{q0}) + \frac{L_{ads}'}{L_{fd}} i_{q0}$$

$$m_1 = \frac{E_B(X_{T_q} \sin\delta_0 - R_T \cos\delta_0)}{D}$$

$$n_1 = \frac{E_B(R_T \sin\delta_0 - X_{T_d} \cos\delta_0)}{D}$$

-continued $$m_2 = \frac{X_{T_q}}{D} \frac{L_{ads}}{(L_{ads} + L_{fd})}$$

$$n_2 = \frac{R_T}{D} \frac{L_{ads}}{(L_{ads} + L_{fd})}$$

B. Initial Conditions $P_{t0}$, $Q_{t0}$ and $E_{t0}$ at the operating point are fixed and the following expressions are used to compute the initial conditions.

$$I_t = \frac{\sqrt{P_t^2 + Q_t^2}}{E_t}$$

$$\Phi = \cos^{-1}\left(\frac{P_t}{E_t I_t}\right)$$

$$\delta_i = \tan^{-1}\left(\frac{X_{qs}I_t\cos\Phi - R_a I_t\sin\Phi}{E_t + R_a I_t\cos\Phi + X_{qs}I_t\sin\Phi}\right)$$

$$e_{d_0} = E_t \sin\delta_i$$

$$e_{q_0} = E_t \cos\delta_i$$

$$i_{d_0} = I_t \sin(\delta_i + \Phi)$$

$$i_{q_0} = I_t \cos(\delta_i + \Phi)$$

$$E_{Bd_0} = e_{d_0} - R_E i_{d_0} + X_E i_{q_0}$$

$$E_{Bq_0} = e_{q_0} - R_E i_{q_0} + X_E i_{d_0}$$

$$\delta_0 = \tan^{-1}\left(\frac{E_{Bd_0}}{E_{Bq_0}}\right)$$

$$E_{B_0} = \sqrt{E_{Bd_0}^2 + E_{Bq_0}^2}$$

$$i_{fd_0} = \frac{e_{q_0} + R_a i_{q_0} + L_{ds} i_{d_0}}{L_{ads}}$$

$$E_{fd_0} = L_{adu} i_{fd_0}$$

$$\Psi_{ad_0} = L_{ads}(-i_{d_0} + i_{fd_0})$$

$$\Psi_{aq_0} = -L_{aqs} i_{q_0}$$

TABLE VI

NOMENCLATURE

| | |
|---|---|
| $P_t$, $Q_t$ | Active and reactive powers transmitted to the grid at machine terminals (p.u.) |
| $E_t$, $I_t$ | Voltage and current at machine terminals (p.u.) |
| $\Phi$ | Power factor (rad) |
| $\delta_i$ | Internal angle (rad) |
| $e_d$, $e_q$ | Terminal voltage d, q-axis components (p.u) |
| $i_d$, $i_q$ | Terminal voltage d, q-axis components (p.u) |
| $E_{Ed}$, $E_{Eq}$ | Bus voltage d, q-axis components (p.u.) |
| $\delta$ | Load angle (rad) |
| $E_B$ | Bus voltage (p.u.) |
| $i_{fd}$ | Rotor field current (p.u.) |
| $E_{fd}$ | Exciter output voltage (p.u.) |
| $\psi_{ad}$, $\psi_{aq}$ | d, q-axis flux linkage (p.u.) |
| $X_{ds}$, $X_{qs}$ | d, q-axis saturated reactances (p.u.) |
| $R_a$ | Stator resistance (p.u.) |
| $L_{adu}$ | Unsaturated mutual inductance in d-axis (p.u.) |
| $L_{ads}$ | Saturated mutual inductance in d-axis (p.u.) |
| $X_E$, $R_E$ | Line reactance and resistance (p.u.) |
| $L_{fd}$ | Rotor field leakage inductance (p.u.) |
| $R_{fd}$ | Rotor field resistance (p.u.) |
| $L_l$ | Leakage inductance (p.u.) |
| $X_{ds}'$ | Transient d-axis saturated reactance (p.u.) |

What is claimed is:

1. A controller for a hydroelectric group, the hydroelectric group comprising:
    a hydraulic sub-system including a turbine, a penstock located upstream the turbine, and a draft tube pipe located downstream the turbine; and
    an electromechanical sub-system comprising a generator and an electrical network connected thereto;
    wherein the controller comprises a processor configured to:
        receive, from a measuring unit, measured values of the hydraulic sub-system and the electromechanical sub-system;
        generate input control variables for the hydraulic sub-system and the electromechanical sub-system so as to reduce oscillations of the active power transmitted to the electrical network;
        determine a hydraulic state vector for the hydraulic subsystem relative to a guide vane opening, a rotational frequency of the turbine, and a head perturbation at a hydraulic system operating point, wherein a plurality of physical variables are derived from a hill chart and linearized around the hydraulic system operating point;
        determine an electric state vector for the electrical subsystem in terms of a speed deviation, a preload angle deviation, and a field flux deviation;
        concatenate the hydraulic state vector and the electric state vector so as to calculate a control variable for the hydraulic sub-system and a control variable for the electromechanical sub-system, wherein the control variables comprise a guide vane opening and an excitation voltage, respectively, wherein concatenating the hydraulic state vector and the electric state vector yields a state-space model for the hydroelectric group,
        determine a variance between an active power value and a reference power value;
        determine a variance between an active voltage value and a reference voltage value; and
        calculate at least one weighting function for the control variables so as to compensate for the determined variances and attenuate active power oscillations of the hydroelectric group induced by hydraulic pressure oscillations resulting from a vortex rope.

2. The controller according to claim 1, wherein said electrical measured values of the electromechanical sub-system include the active power and the active voltage of the generator.

3. The controller according to claim 1, further comprising:
    a first control unit configured to receive as input a variance of the measured active power versus the reference value and to output the control variable for the hydraulic sub-system; and
    a second control unit configured to receive as input a variance of the measured voltage versus the reference value and to output the control variable for the electromechanical sub-system.

4. A hydroelectric group comprising a controller according to claim 1.

5. A method for controlling an electrical output of a hydroelectric group, the hydroelectric group comprising:
    a hydraulic sub-system including a turbine, a penstock located upstream the turbine, and a draft tube pipe located downstream the turbine;
    an electromechanical sub-system comprising a generator and an electrical network connected thereto; and
    a controller;

the method comprising:
   measuring electrical values of the hydroelectric group;
   measuring the shaft rotational speed of the turbine;
   deriving a plurality of physical variables from a hill chart for the hydraulic sub-system at a hydraulic system operating point;
   linearizing equations for a flow through the turbine and for a mechanical torque produced by the turbine around the hydraulic system operating point;
   determining a hydraulic state vector for the hydraulic subsystem relative to a guide vane opening, a rotational frequency of the turbine, and a head perturbation at the hydraulic system operating point;
   determining an electric state vector for the electrical subsystem in terms of a speed deviation, a preload angle deviation, and a field flux deviation;
   concatenating the hydraulic state vector and the electric state vector so as to calculate a control variable for the hydraulic sub-system and a control variable for the electromechanical sub-system, wherein the control variables are a guide vane opening and an excitation voltage respectively, wherein concatenating the hydraulic state vector and the electric state vector yields a state-space model for the hydroelectric group;
   determining a variance between the active power value and a reference power value;
   determining a variance between the active voltage value and a reference voltage value; and
   calculating at least one weighting function for the calculated control variables so as to compensate for the determined variance and attenuate active power oscillations of the hydroelectric group induced by hydraulic pressure oscillations resulting from a vortex rope; and
   using the control variables to operate the hydroelectric group to reduce oscillations of the active power of the generator.

6. The method of controlling an electrical output of a hydroelectric group according to claim 5, wherein said electrical measured values of the hydroelectric group include an active power and a voltage of the generator.

* * * * *